(12) United States Patent
Sakushima et al.

(10) Patent No.: US 6,555,841 B1
(45) Date of Patent: Apr. 29, 2003

(54) TESTABLE SUBSTRATE AND A TESTING METHOD

(75) Inventors: Shiro Sakushima, Seika-cho (JP); Koji Takemura, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/610,502

(22) Filed: Jul. 6, 2000

(30) Foreign Application Priority Data

Jul. 6, 1999 (JP) ............................................. 11-192049

(51) Int. Cl.$^7$ ............................................... H01L 29/10
(52) U.S. Cl. ............................ 257/48; 257/81; 257/82; 257/431; 257/432; 257/760; 257/99
(58) Field of Search ........................... 257/82, 431, 81, 257/432, 48, 760, 59, 99; 385/88

(56) References Cited

U.S. PATENT DOCUMENTS 5,196,692 A * 3/1993 Arinaga et al. .......... 250/208.1
5,616,960 A * 4/1997 Noda et al. .................. 257/760

FOREIGN PATENT DOCUMENTS

JP 405335605 * 12/1993
JP 406045625 A * 2/1994

* cited by examiner

Primary Examiner—Eddie Lee
Assistant Examiner—Joseph Nguyen
(74) Attorney, Agent, or Firm—Hogan & Hartson, LLP

(57) ABSTRACT

A testable substrate for mounting an optical component is provided with a base member having a plurality of optical component mounting areas in which light emitters and light detectors for detecting lights emitted from the light emitters are mounted, a first insulating layer formed on the base member, a second insulating layer formed on the first insulating layer, two kinds of conductive lines to be connected with opposite electrode terminals of the light emitters mounted in the respective optical component mounting areas, and two kinds of conductive lines to be connected with opposite electrode terminals of the light detectors mounted in the respective optical component mounting areas. At least one of the two kinds of conductive lines to be connected with the light emitters and at least one of the two kinds of conductive lines to be connected with the light detectors are laid on different ones of the first and second insulating layers.

7 Claims, 14 Drawing Sheets

TESTABLE SUBSTRATE AND A TESTING METHOD

BACKGROUND OF THE INVENTION

This invention relates to a testable substrate or wafer and a testing method which enable efficient fabrication of an optical component mounting substrate on which an optical fiber and optical components (e.g., a light emitter and a light detector) to be optically coupled to each other while enabling an efficient testing of the optical components mounted on the optical component mounting substrate.

In recent years, toward the spread of communication systems of optical subscriber type, attention has been drawn to a passive alignment technique using a monocrystalline silicon substrate as a mounting substrate (this substrate is called silicon platform) in order to reduce an assembling cost of an optical module.

According to this technique, an optical module can be assembled without alignment only by mounting the optical fiber and the optical components such as a laser diode and a photodiode in a V-shaped groove or a conductor pattern formed on the same silicon substrate.

Such optical component mounting substrates are fabricated at once with V-shaped grooves for mounting the optical fibers and a plurality of conductor patterns for mounting the optical components arrayed on the same wafer, and are divided or split into individual substrates at a final process. FIGS. 16A and 16B shows an optical component mounting substrate J formed into a chip by dividing.

Fabrication of a multitude of optical component mounting substrates from one wafer is very advantageous in terms of production costs and is desirable in terms of cost reduction of the optical module. Further, the use of silicon wafers has an advantage of significant cost reduction at the time of mass-production since the mass-production technique of semiconductor devices can be employed.

However, even if the mounting substrates are fabricated by the wafer, it is extremely cumbersome and is considered to cause a cost increase to mount the optical components one by one on the mounting substrates in the form of a chip and to test the respective devices.

Accordingly, it is highly desirable to, similar to a so-called burn-in which has been conventionally employed in the semiconductor field, enable a detection of initial defects in a mounting process including defects of a plurality of optical components themselves after the optical components are mounted at once while employing a visual alignment technique, a solder self-alignment technique or like technique for mounting a multitude of optical components while observing mounting markers on a wafer.

In order to realize the above method, at least following problems have to be overcome.

1) In order to check initial deterioration of a light emitter and a light detector for monitoring a light from the light emitter which are provided on each substrate 50 in the form of a chip as shown in FIGS. 16A and 16B, not only electrical characteristics of these optical components, but also light emitting characteristics and light detecting characteristics thereof need to be measured. However, it is difficult to conduct these measurements with the conventional optical component mounting substrate J since no sufficient space can be provided for an optical detector for testing the light emitter and a light source for testing the light detector. In FIGS. 16A and 16B, indicated at 53, 54 are driving conductive lines for the light emitter, 15, 16 driving conductive lines for the light detector, 17 a V-shaped groove in which an optical fiber is laid, 18a a solder pattern on which the light emitter is mounted, and 16a a solder pattern on which the light detector is mounted.

2) If an attempt is made to electrically connect all electrodes similar to a wafer burn-in device used in the semiconductor field, not only many contact terminals, but also a highly expensive contactor for simultaneously connect the many contact terminals are necessary. Particularly, since the optical components are mounted in a hybrid manner, it is even more difficult to establish the above contacts without damaging them.

3) Although it may be considered to provide a wiring to conduct probing at an end of the wafer in order to avoid the problem 2), the wiring becomes complicated due to its intersections.

SUMMARY OF THE INVENTION

It is an object of the present invention to provide a testable substrate and a testing method which are free from the problems residing in the prior art.

It is another object of the present invention to provide a testable substrate and a testing method which enable a burn-in to be easily and readily performed to a wafer on which optical components are mounted all at once and also enable the optical components to be quickly tested.

According to an aspect of the invention, a testable substrate comprises a base member having a plurality of optical component mounting areas in which light emitters and light detectors for detecting lights emitted from the light emitters are to be mounted; a first insulating layer formed on the base member; a second insulating layer formed on the first insulating layer; two kinds of conductive lines connectable with opposite electrode terminals of light emitters mounted in the respective optical component mounting areas; and two kinds of conductive lines connectable with opposite electrode terminals of light detectors mounted in the respective optical component mounting areas, wherein at least one of the two kinds of conductive lines connectable with light emitters and at least one of the two kinds of conductive lines connectable with light detectors are laid on different ones of the first and second insulating layers.

According to another aspect of the invention, a testing method comprises the steps of preparing a substrate having a plurality of optical component mounting areas; mounting in the respective optical component mounting areas light emitters and light detectors for detecting light emitted from the light emitters; heating the substrate mounted with the light emitters and the light detectors to a predetermined temperature; and driving the light emitters and the light detectors with the substrate having the predetermined temperature to measure the amount of light emitted from each light emitter by the corresponding light detector.

With the above construction and method, the light emitters and the light detectors can be tested in their mounted states by mounting them in the respective optical component mounting areas, driving them via the respective conductive lines with the substrate heated at the predetermined temperature, and measuring the amounts of lights emitted from the respective light emitters by means of the corresponding light detectors. More specifically, the amount of light measured by the light detectors do not reach a specified value if there are defects in the light emitters and the light detectors themselves, errors made during an operation of mounting them, breakage of the conductive lines, and the like. A specified amount of light cannot be detected, either, if there is a displacement between the corresponding light emitters and light detectors during the mounting operation. Therefore, any defect in an optical module, e.g., defects in light emitters and light detectors, can be securely and quickly detected in optical component mounted states.

BRIEF DESCRIPTION OF THE DRAWINGS

FIG. 2B shows an upper insulating layer in which the conductive lines of FIG. 2A are laid, and FIG. 2C mainly shows conductive lines laid below the upper insulating layer and connected with light detectors;

DETAILED DESCRIPTION OF THE PREFERRED EMBODIMENTS OF THE INVENTION

[Burn-In Substrate and Burn-In Method]

Figure 1:
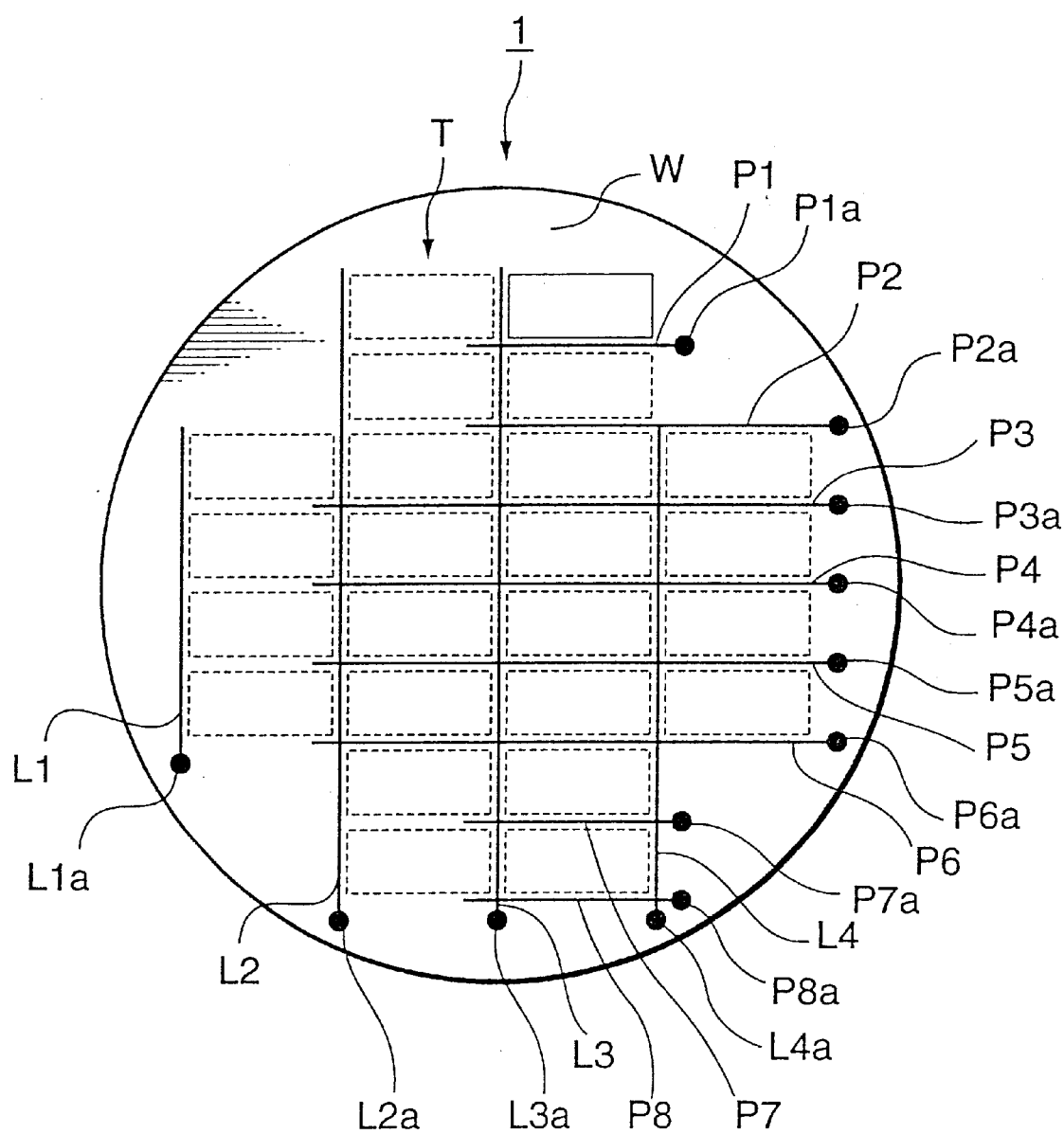
FIG. 1 is a plan view diagrammatically showing a burn-in substrate according to an embodiment of the invention.

FIG. 1 is a diagrammatic plan view of a burn-in substrate 1 which is a testable substrate. A multitude of optical component mounting substrate (chip) regions T shown in broken lines are arrayed in a plurality of rows and columns on a substrate or wafer made of silicon monocrystal of a specified plane. In FIG. 1, indicated at L1, L2, L3, L4 are conductive lines or signal lines to be connected with upper electrode terminals of light emitters such as semiconductor lasers which are present in the same columns, and indicated at P1, P2, P3, P4, P5, P6, P7, and P8 are conductive lines or signal lines to be connected with upper electrode terminals of light detectors such as photodiodes which are present in the same rows. Indicated at L1a, L2a, L3a, L4a, and P1a, P2a, P3a, P4a, P5a, P6a, P7a, and P8a are conductive terminals in the respective signal lines. In FIG. 1, ground lines are not shown for the sake of simplicity.

Figure 2A:
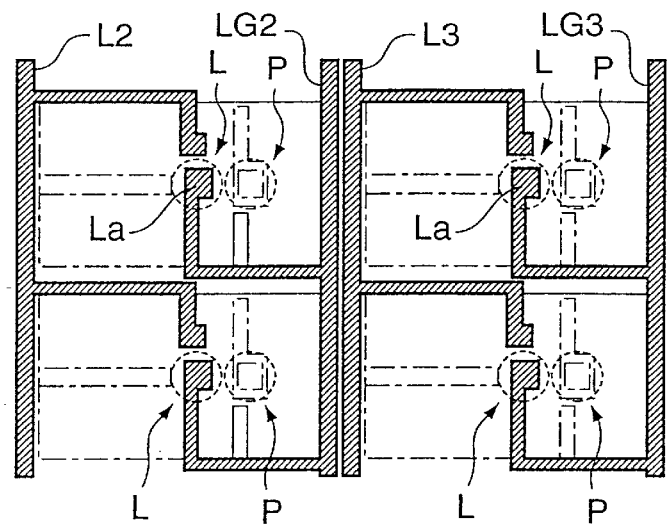
FIGS. 2A, 2B and 2C are plan views diagrammatically showing a portion of the burn-in substrate, wherein FIG. 2A mainly shows conductive lines connected with light emitters.
Figure 2B:
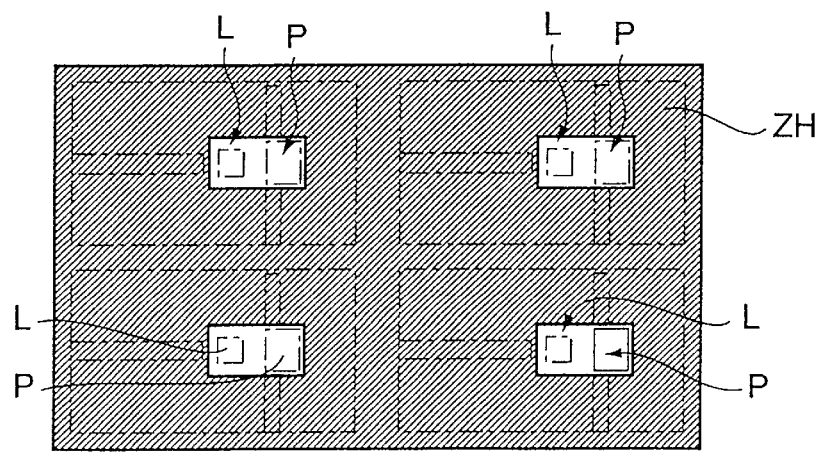
Figure 2C:
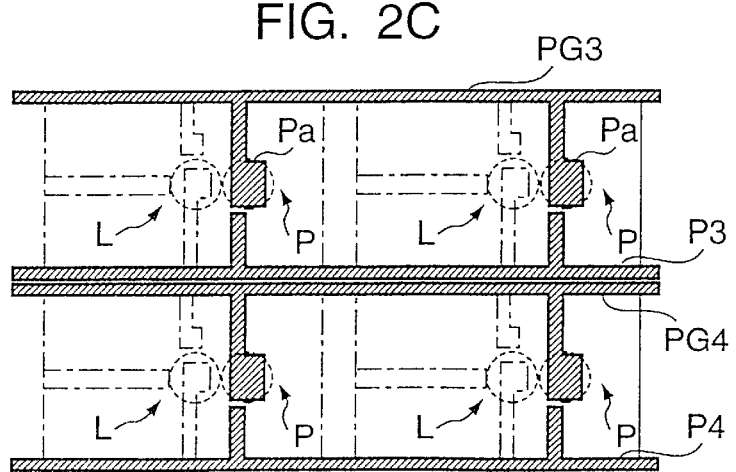

FIGS. 2A, 2B and 2C diagrammatically show line patterns in one area (corresponding to four optical component mounting substrate 4) of the substrate 1 shown in FIG. 1. FIG. 2A shows the signal lines L2, L3 and ground lines LG2, LG3 which are first conductive lines formed on the uppermost surface of the burn-in substrate and are to be connected with the upper electrode terminals of the light emitters. FIG. 2B shows a schematic pattern (fine openings and the like are not shown) of an upper insulating layer ZH on which the first conductive line (signal lines and ground lines) are provided. FIG. 2C shows the signal lines P3, P4 and the ground lines PG3, PG4 which are second conductive lines provided below the upper insulating layer ZH and above an lower insulating layer formed on the substrate 1 and are to be connected with the electrode terminals on the upper surfaces of the light detectors.

In FIGS. 2A to 2C, L indicates a first mounting area where the light emitter is provided, and P indicates a second mounting area where the light detector is provided. For example, the upper electrode terminals of the light emitters located in the same column and mounted in the first mounting area are connected with the signal lines L2 L3, . . . located at the left side of the light emitters while lower electrode terminals thereof are connected with the ground lines LG2, LG3, . . . located at the right side of the light emitters.

Further, the upper electrode terminals of the light detectors located in the same row are connected with the signal lines P3 P4, . . . located below the light detectors while lower electrode terminals thereof are connected with the ground lines PG3, PG4, . . . located above the light detectors. Since the conductive lines connected with the light emitters are arranged on the upper insulating layer ZH formed on the conductive lines connected with the light detectors, the conductive lines for the light emitters and those for the light detectors can be electrically connected with the respective elements without contacting each other, and can be easily arranged.

Next, a burn-in method which is a testing method for testing the light emitters and the light detectors as parts of the optical module is described with reference to FIGS. 2A to 2C.

First, a plurality of light emitters and a plurality of light detectors for monitoring the light emitters are fixed on wiring electrodes La formed in the first mounting area L of the burn-in substrate 1 and on wiring electrodes Pa formed in the second mounting area P by visual alignment or solder self-alignment using, for example, a gold-tin alloy solder.

Next, in order to conduct an accelerated test, with the substrate heated, for example, at about 85° C., a current above a threshold value of the light emitters is applied to the signal line L1 for the light emitters to drive the light emitters in the same column. The light detectors in the same rows are successively driven via the signal lines P3, P4, P5, P6 and amounts of light emitted from the respective light emitters and received by the corresponding light detectors are successively detected or measured. In this way, by successively driving the light emitters in the respective columns and the light detectors in the respective columns corresponding to the light emitters, the light emitters and the light detectors are tested based on the amounts of light detected by the light detectors corresponding to the light emitters. The amount of light of the light emitter can be obtained, for example, based on a value of the current flowing in the corresponding light detector. A measuring apparatus for measuring the amounts of light detected by the light detectors are not shown in order to simplify the drawings.

In this way, if the amount of light emitted from the light emitter and detected by the light detector is measured, the obtained amount falls short of a specified level when there is a defect in the light emitter and the light detector themselves, an error in mounting these elements, a breakage of lines or like error or defect. Such a specified amount of light cannot be obtained due to a displacement between the light emitter and the light detector during mounting, either. Thus, an error during mounting of the optical components can be securely and quickly detected in any arbitrary substrate region T.

It is preferable to use light detectors of end reception type for the following region. Since defects of and a displacement between a pair of the optical components are detected by detecting the amount of light emitted by the light emitter by the corresponding light detector according to the inventive burn-in method, it is preferable to directly detect the amount of light emitted from the light emitter.

By arranging the respective conductive lines in a matrix manner as shown in FIG. 1, a defective substrate (chip) region T can be specified based on the column of the light emitters to which the current is applied and the row of the corresponding light detectors. However, such an pattern arrangement requires the signal line of the light emitters and the one of the light detectors (for example, signal lines L2 and P3) not to be short-circuited in an area where they intersect with each other. In this embodiment, since the two conductive lines connected with the two electrode terminals of the light emitter and the two conductive lines connected with the two electrode terminals of the light detector are formed on the different insulating layers, respectively, there is no likelihood of a short circuit.

Alternatively, one (e.g., signal line) of the two conductive lines (signal line and ground line) connected with the two electrode terminals of the light emitter and one (e.g., signal line) of the two conductive lines (signal line and ground line) connected with the two electrode terminals of the light detector may be formed on the different insulating layers, whereas the remaining conductive lines (e.g., ground lines) may be formed on the same insulating layer.

Figure 3A:
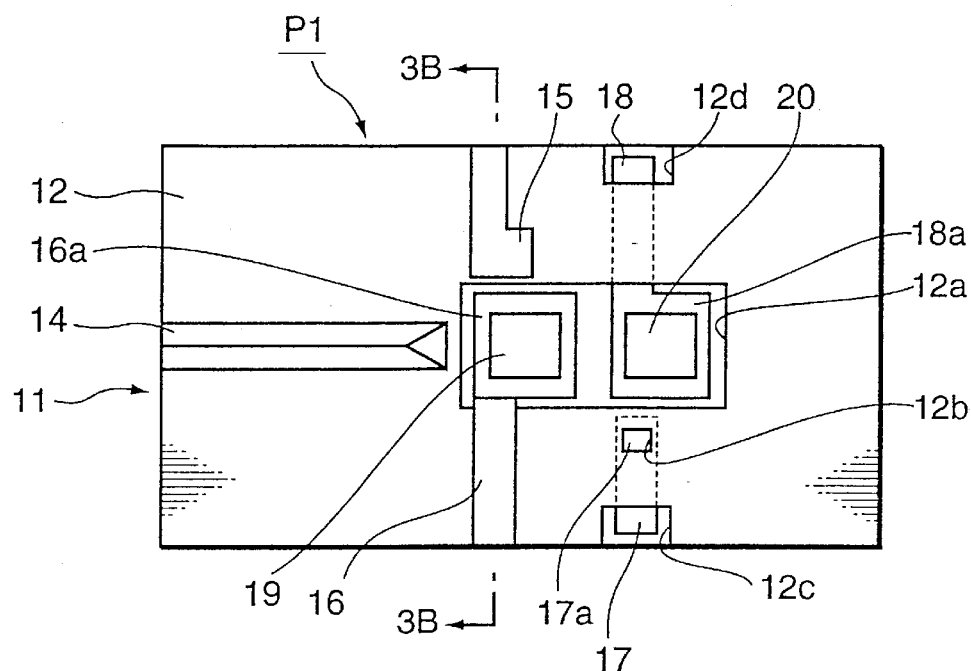
FIG. 3A is a plan view diagrammatically showing an optical component mounting substrate according to another embodiment of the invention.
Figure 3B:
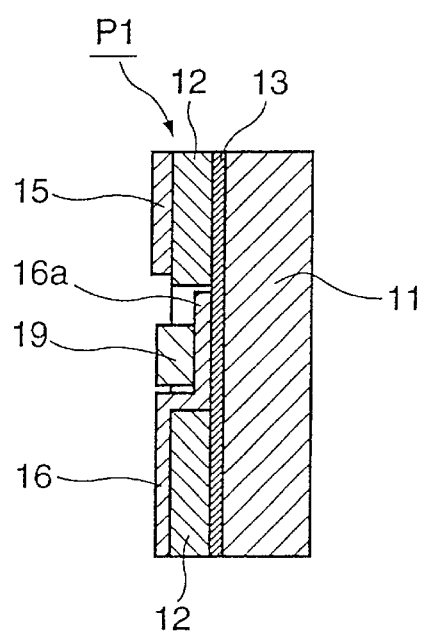
FIG. 3B is a section taken along the line 3B—3B of the optical component mounting substrate shown in FIG. 3A.
Figure 4:
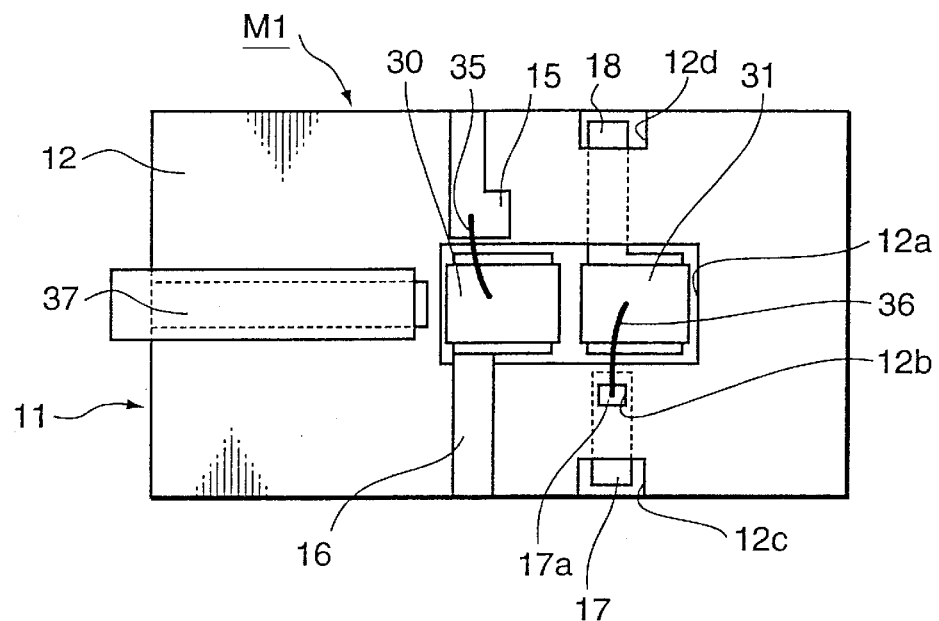
FIG. 4 is a plan view diagrammatically showing an optical module constructed by mounting optical components on the optical component mounting substrate shown in FIGS. 3A and 3B.
Figure 5:
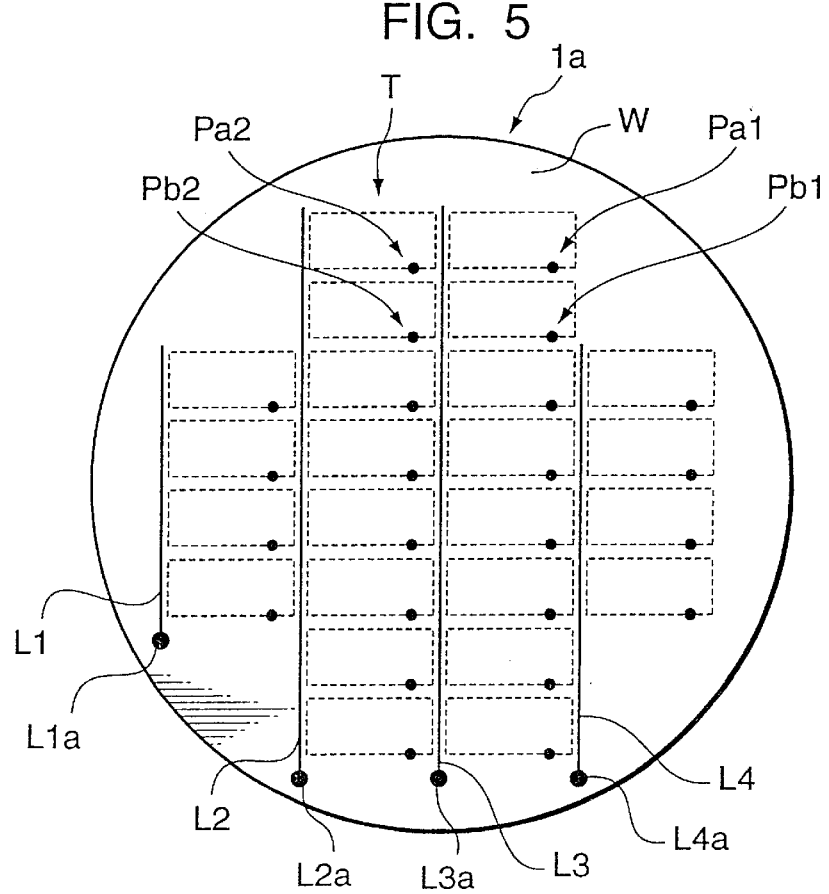
FIG. 5 is a plan view diagrammatically showing a burn-in substrate according to still another embodiment of the invention.
Figure 6A:
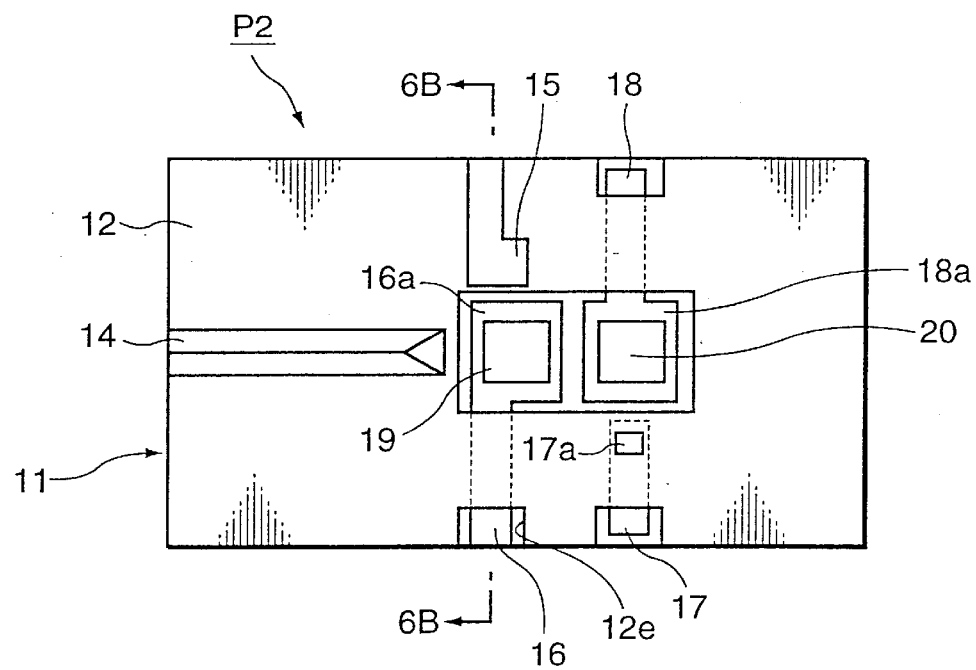
FIG. 6A is a plan view diagrammatically showing an optical component mounting substrate according to further another embodiment of the invention.
Figure 6B:
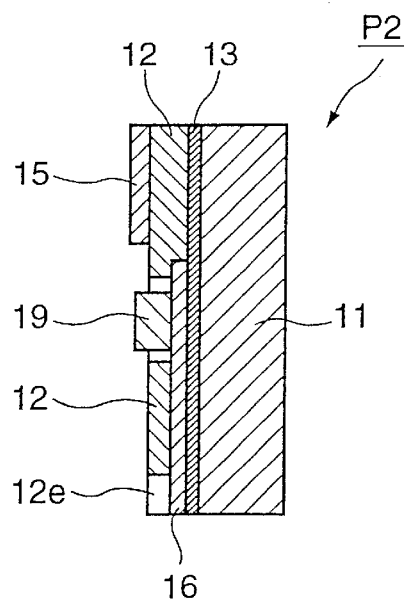
FIG. 6B is a section taken along the line 6B—6B of the optical component mounting substrate shown in FIG. 6A.

After completion of the above test, individual chips obtained by vertically and horizontally cutting the burn-in substrate W along lines overlapping the respective conductive lines located at the outlines of the respective substrate regions T become optical component mounting substrates P1, for example, as shown in FIGS. 3A and 3B. As shown in FIG. 4, an optical module M1 can be constructed by, on the substrate P1, mounting a light emitter 30 and a light detector 31 on a solder pattern 19 and a solder pattern 20 shown in FIG. 3A and mounting an optical fiber 37 in a V-shaped groove 14 formed beforehand. In FIG. 4, indicated at 35 is a bonding wire for connecting the upper electrode terminal of the light emitter 30 with a signal line 15, and at 36 a bonding wire for connecting the upper electrode terminal of the light detector 31 with a signal line 17.

According to the inventive burn-in method, instead of providing the signal lines in common to the light detectors in the same column (they are common in FIG. 1), signal terminals Pa1, Pa2, Pb1, Pb2, . . . independent from each other may be provided for the respective substrate regions T. For example, in the case of applying a power to the signal line L3, burn-in may be performed by applying a power to the signal terminals Pa2, Pb2, . . . of the individual light detectors. By doing so, the construction of the insulating layers are not restricted, whereas the signals of the light detectors need to be individually detected. These individual chips obtained by cutting such a burn-in substrate 1a become, for example, optical component mounting substrates P2 to P4 as shown in FIGS. 6A, 6B, 7A, 7B, 8A and 8B. A mode of optical modules constructed by mounting optical elements and optical wave guides on the substrates P2 to P4 is similar to the optical module M1 shown in FIG. 4.

[Optical Component Mounting Substrate]

Next, optical component mounting substrates obtained by individually cutting the burn-in wafer will be described in detail. It should be noted that in FIGS. 6A, 6B, 7A, 7B, 8A and 8B, the same numbers are given to those identical to the embodiment shown in FIGS. 3A and 3B, and repetitive description is not given to them.

As shown in FIGS. 3A and 3B, the mounting substrate P1 is constructed as follows. The lower insulating layer 13 having a thickness of about several 1000s Å is formed on the outer surface of a substrate 11 made of a silicon monocrystal having a principle plane of a specified plane (e.g., (100) plane by Miller indices) by thermal oxidation. Electrode pads 16a, 18a and solder patterns 19, 20 on which the lower electrode terminals of the light emitter and the light detector are placed are provided on the lower insulating layer 13. These electrode pads 16a, 18a are formed while being accurately positioned with respect to the V-shaped groove 14 which is formed in the substrate 11 by anisotropic etching using an alkaline solution of, e.g., KOH and in which an optical waveguide such as an optical fiber is mounted.

The upper and lower layers of the electrode pads are made of, e.g., Au/Pt/Ti or Au/Cu or the like and has a thickness of 0.3 to 2.0 $\mu$m, and the solder patterns are made of, e.g. an Au—Sn alloy.

The conductive line 17 which is a conductive pattern for signal or signal line connected to the upper electrode terminal of the light detector by a bonding wire to be described later and the conductive line 18 which is a conductive pattern for grounding or ground line connected to the electrode pad 18a for mounting the lower electrode terminal of the light detector are formed on the lower insulating layer 13. On the lower insulating layer 13 is further formed an upper insulating layer 12 made of silicon oxide or silicon nitride and having a thickness of 0.1 µm or larger. The upper insulating layer 12 is formed with an opening 12a in an optical component mounting area, an opening 12b in a wire bonding area of the conductive line 17, and openings 12c, 12d in drawing areas of the conductive lines 17, 18.

On the other hand, the conductive line 15 which is a conductive pattern for signal or signal line connected to the upper electrode terminal of the light emitter by a bonding wire to be described later and a conductive line 16 which is a conductive pattern for grounding or ground line connected to the electrode pad 16a for mounting the lower electrode terminal of the light emitter are formed on the upper insulating layer 12. It is assumed that the respective conductive lines are made of the same or similar material and have the same or similar thickness as the electrode pads.

With the optical component mounting substrate P1 thus constructed, not only wafer burn-in can be satisfactorily performed, but also the parasitic capacity of line pattern can be reduced by thickening the upper insulating layer 12. Further, this mounting substrate P1 can provide an excellent optical module having an excellent thermal stability and a suitable high frequency responding characteristic.

Figure 9A:
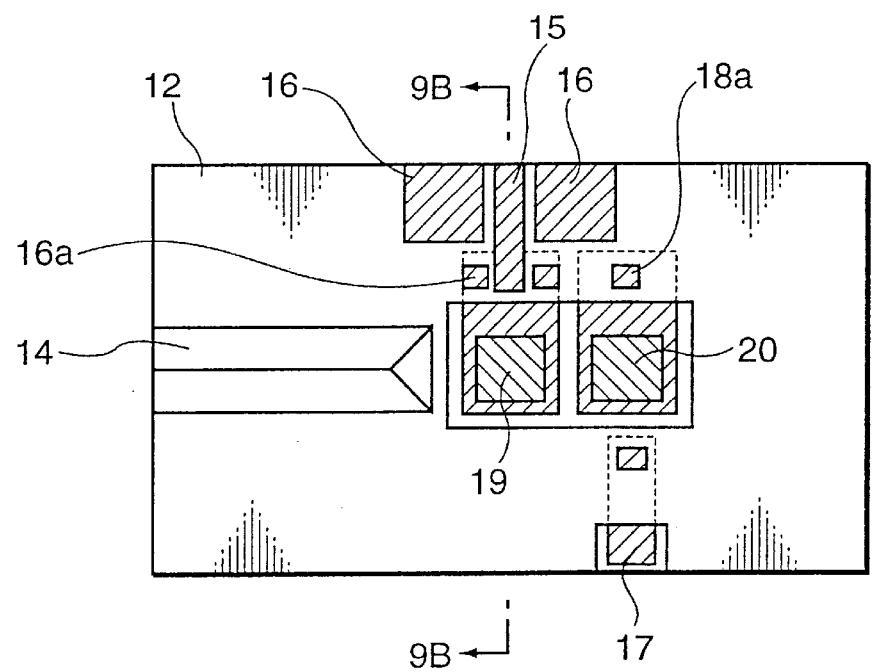
FIG. 9A is a plan view diagrammatically showing an optical component mounting substrate according to still further embodiment of the invention.
Figure 9B:
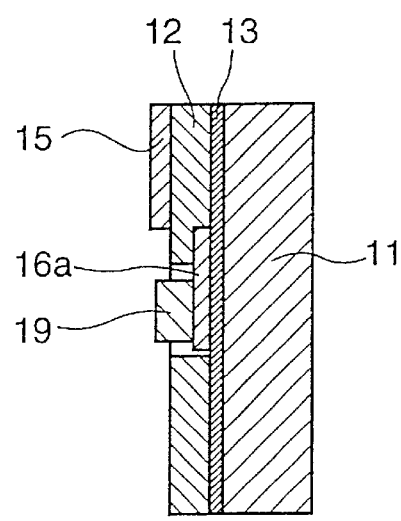
FIG. 9B is a section taken along the line 9B—9B of the optical component mounting substrate shown in FIG. 9A.
Figure 10A:
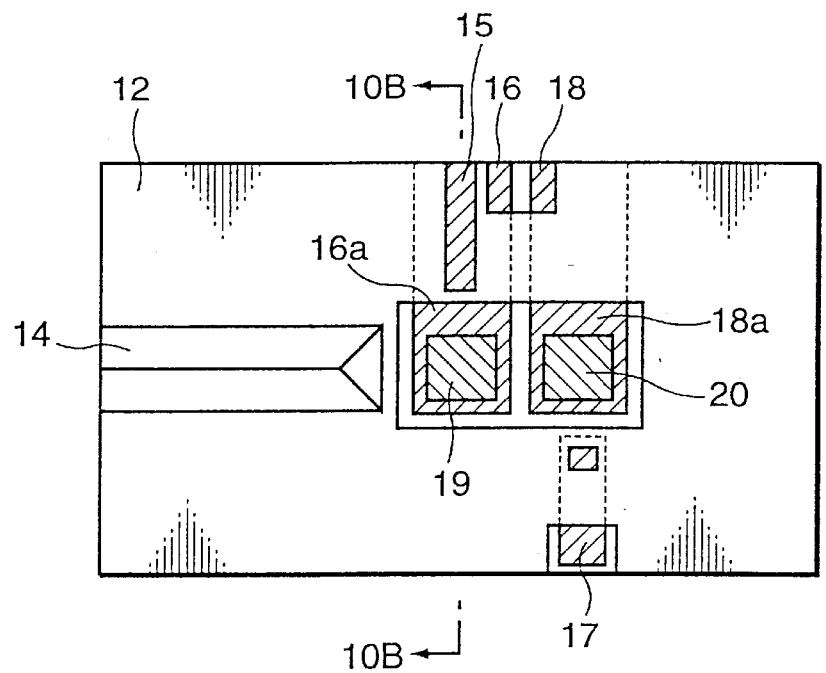
FIG. 10A is a plan view diagrammatically showing an optical component mounting substrate according to yet further embodiment of the invention.
Figure 10B:
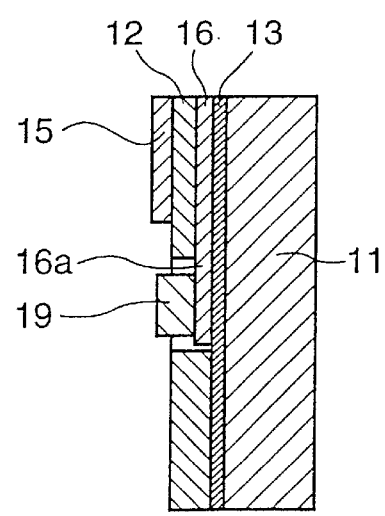
FIG. 10B is a section taken along the line 10B—10B of the optical component mounting substrate shown in FIG. 10A.
Figure 11:
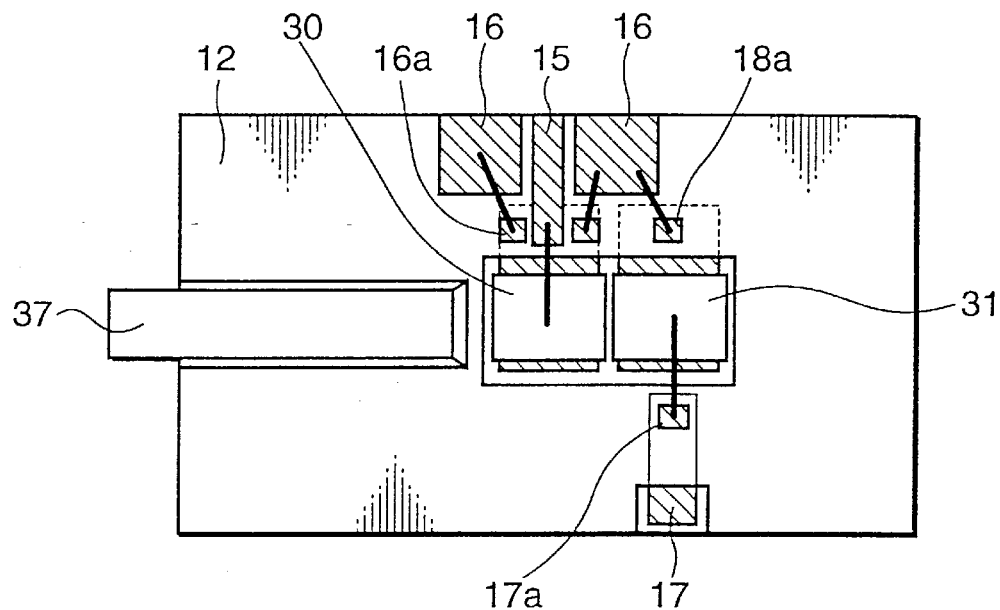
FIG. 11 is a plan view of an optical module using the optical component mounting substrate shown in FIGS. 9A and 9B.
Figure 12:
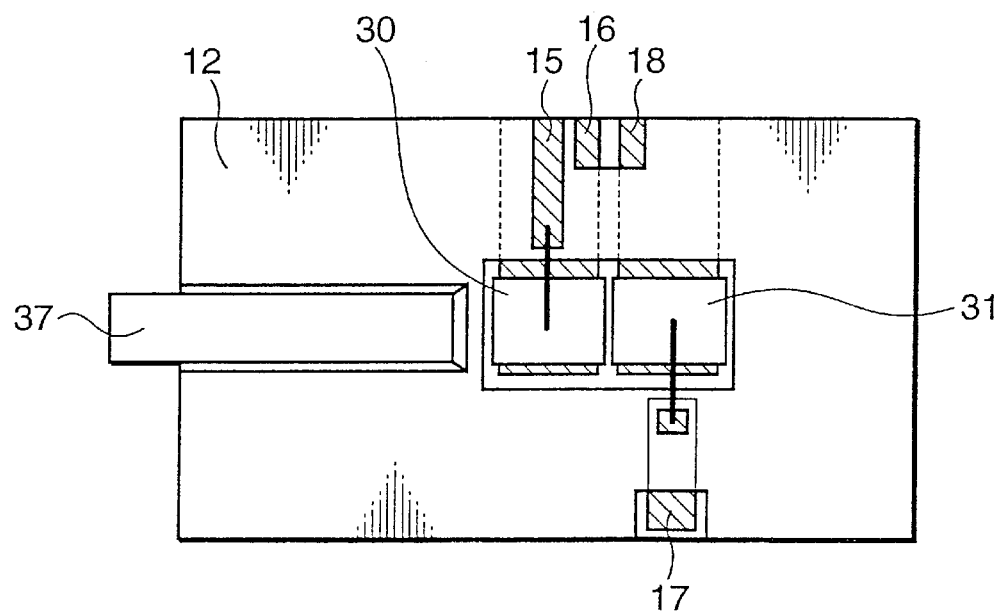
FIG. 12 is a plan view of an optical module using the optical component mounting substrate shown in FIGS. 10A and 10B.

Although the signal lines and the ground lines are formed at positions opposite to each other, a line pattern construction having a more suitable high frequency responding characteristic can be realized by providing a conductive pattern for grounding or ground line 16 at the opposite sides of a conductive pattern for signal or signal electrode 15 on the upper insulating layer 12 as shown in FIGS. 9A and 9B, or providing a conductive pattern for grounding or ground line 16 on the lower insulating layer, 13 on which the lower electrode terminal of the optical component is placed, so as to extend on an underside part of the upper insulating layer 12, on which a conductive pattern for signal or signal electrode 15 is placed, facing the signal electrode 15 as shown in FIGS. 10A and 10B. FIG. 11 shows a pattern construction when the light emitter 30, the light detector 31, and the optical fiber 37 are mounted on the optical component mounting substrate shown in FIGS. 9A and 9B. FIG. 12 shows a pattern construction when the light emitter 30, the light detector 31, and the optical fiber 37 are mounted on the optical component mounting substrate shown in FIGS. 10A and 10B.

The conductive pattern 16 shown in FIGS. 9A and 9B are connected to an electrode pad 16a on the lower insulating layer 13, on which the lower electrode terminal of the optical component is placed, via a bonding wire. Although the coplanar construction and the strip-line construction are employed for the light emitter, they may be employed for the light detector.

Next, another optical component mounting substrate will be described. A conductive line 16 which is a conductive pattern for grounding connected to the lower electrode terminal of the light emitter may be, for example, provided below an upper insulating layer 12 as in an optical component mounting substrate P2 shown in FIGS. 6A and 6B. However, in such a case, an opening 12e for drawing the conductive line 16 is formed in the upper insulating layer 12 as shown.

Figure 7A:
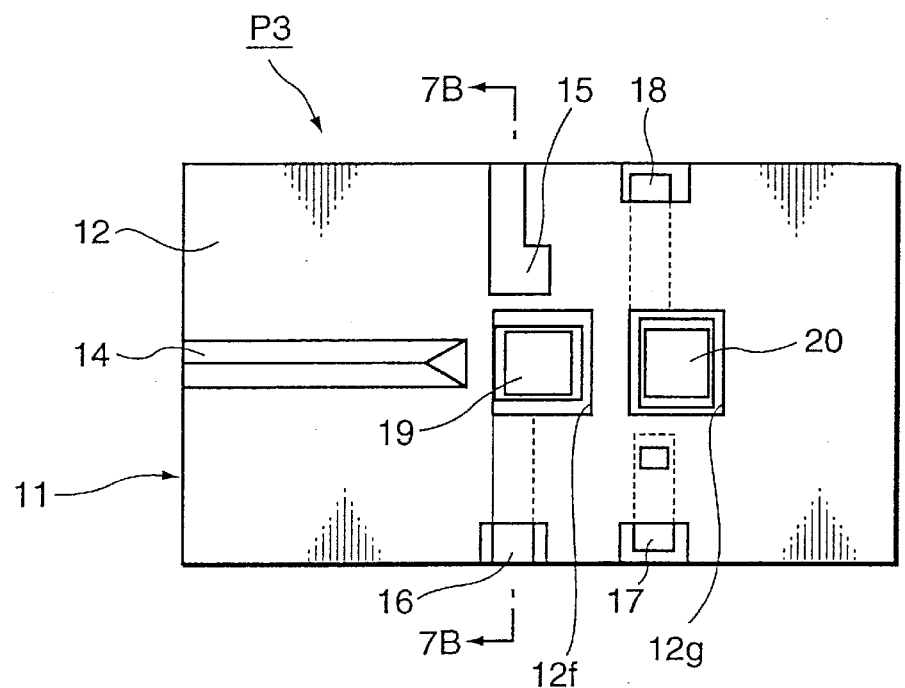
FIG. 7A is a plan view diagrammatically showing an optical component mounting substrate according to yet another embodiment of the invention.
Figure 7B:
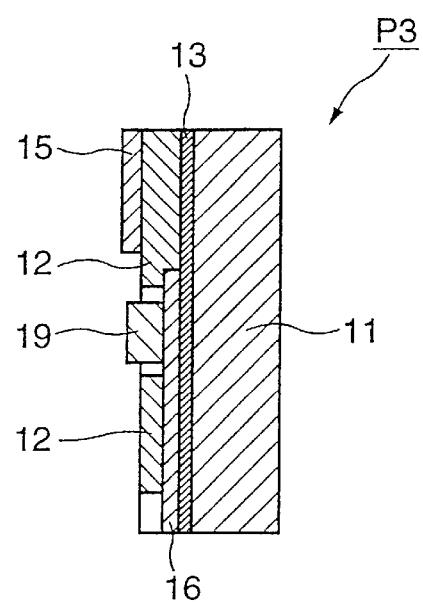
FIG. 7B is a section taken along the line 7B—7B of the optical component mounting substrate shown in FIG. 7A.

Further, an upper insulating layer 12 having openings 12f, 12g may be formed for each optical component as in an optical component mounting substrate P3 shown in FIGS. 7A and 7B. This construction can suppress the flow of the solder to the pattern lines of the each optical component and can prevent the solder composition from changing.

Figure 8A:
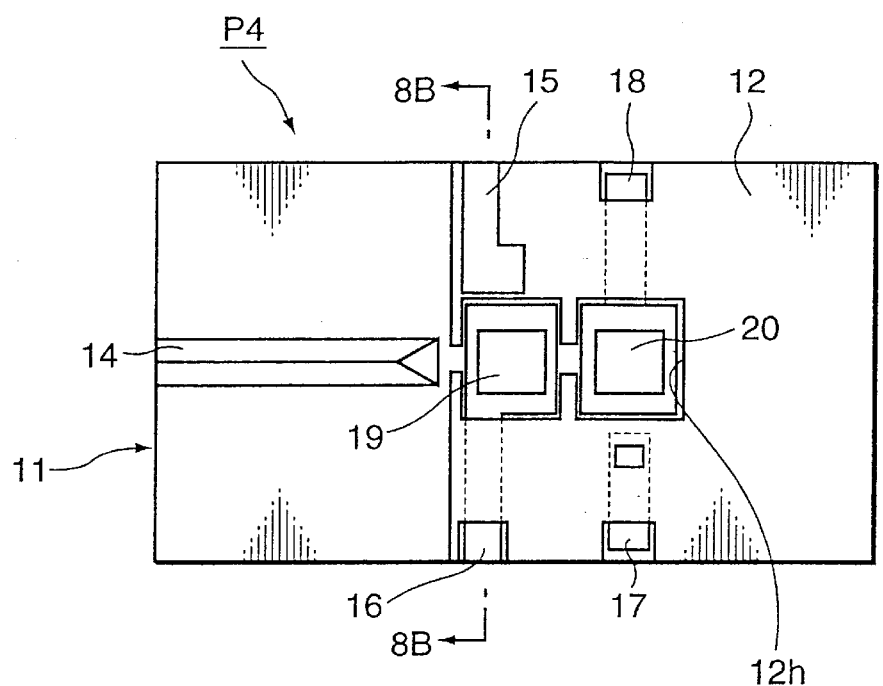
FIG. 8A is a plan view diagrammatically showing an optical component mounting substrate according to still yet another embodiment of the invention.
Figure 8B:
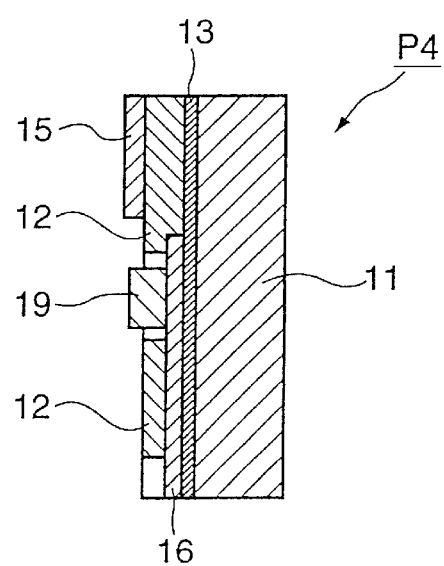
FIG. 8B is a section taken along the line 8B—8B of the optical component mounting substrate shown in FIG. 8A.

Furthermore, an upper insulating layer 12 formed with a specially shaped opening 12h (i.e., such a shape as to connect the centers of the facing sides of the openings 12f, 12g shown in FIG. 7A) may be provided at only a side of the optical component mounting area where the optical components are provided (i.e., substantially right half of FIG. 8A) as in an optical component mounting substrate P4 shown in FIGS. 8A and 8B. By taking such a construction, the optical fiber can be abutted against a wall surface formed by the upper insulating layer 12 to be positioned while being mounted.

Figure 13:
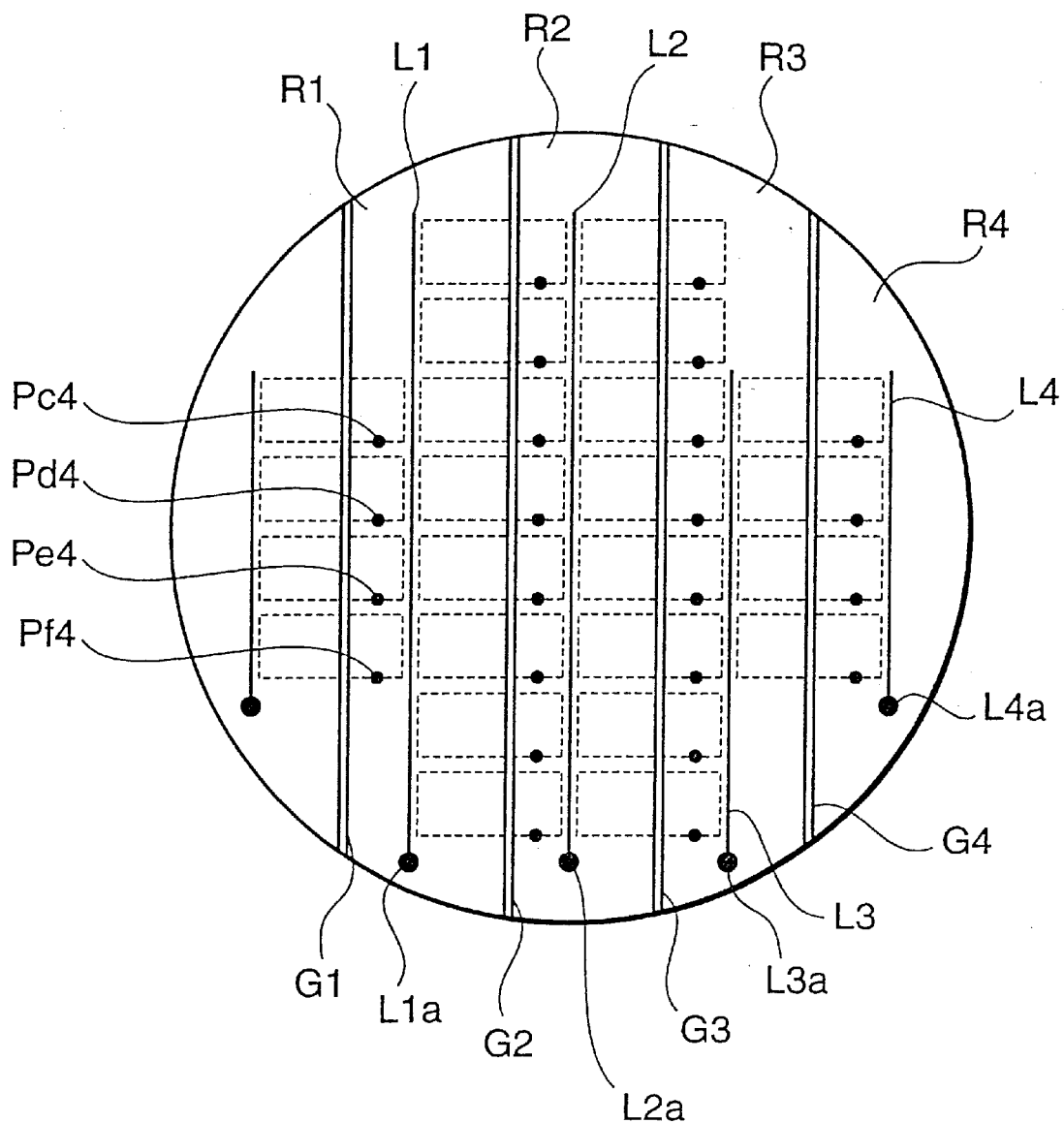
FIG. 13 is a plan view diagrammatically showing an optical component mounting substrate according to yet further embodiment of the invention.
Figure 14A:
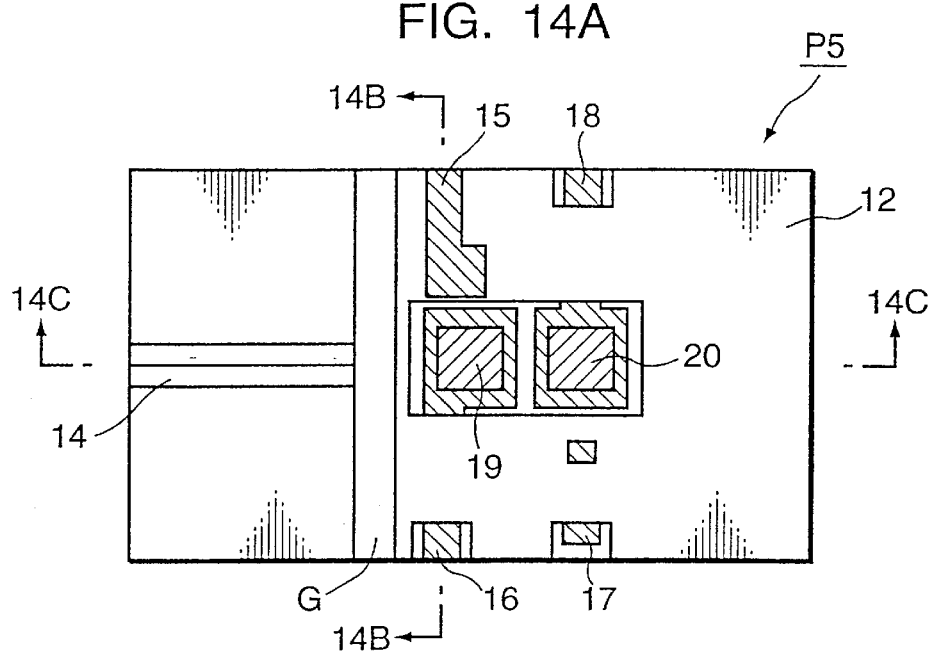
FIG. 14A is a plan view diagrammatically showing an optical component mounting substrate according to still yet further embodiment of the invention.
Figure 14B:
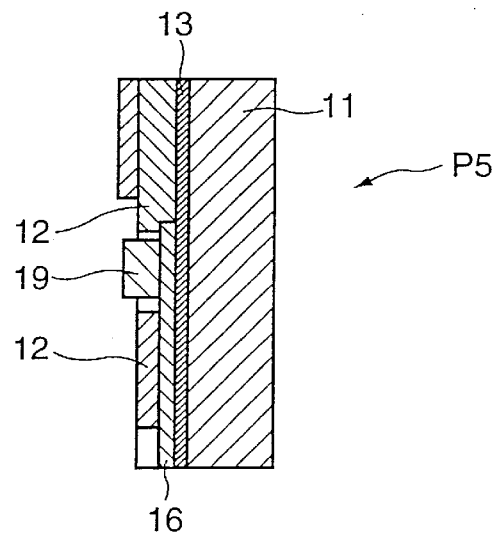
FIG. 14B is a section taken along the line 14B—14B of the optical component mounting substrate shown in FIG. 14A.
Figure 14C:
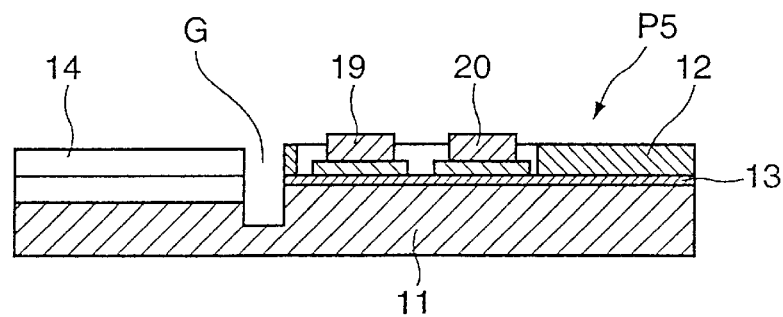
FIG. 14C is a section taken along the line 14C—14C of the optical component mounting substrate shown in FIG. 14A.

In view of line pattern for burn-in, no rectangular groove is formed by dicing or the like for positioning the optical fiber and the light emitter along a direction of optic axis in the foregoing embodiments. However, a similar burn-in test can be conducted by employing rectangular grooves (G1 to G4) and a pattern construction as shown in FIG. 13. What should be noted for line pattern in this case is to arrange the conductive line and the signal terminal for the power application to the light emitters in the same column and the signal terminals for the power application to the light detectors in the same area (R1 to R4) separated by the rectangular grooves. For instance, the line pattern and the signal terminal for testing the chips in the leftmost column of FIG. 13 (the conductive line L1 for the power application to the light emitters and the signal terminal L1a, and the signal terminals Pc4 to Pf4 for the power application to the light detectors) need to be arranged in the area R1 divided by the rectangular grooves G1 and G2. In such a case, an optical component mounting substrate P5 having the rectangular groove G as shown in FIGS. 14A, 14B and 14C can be formed.

Figure 15A:
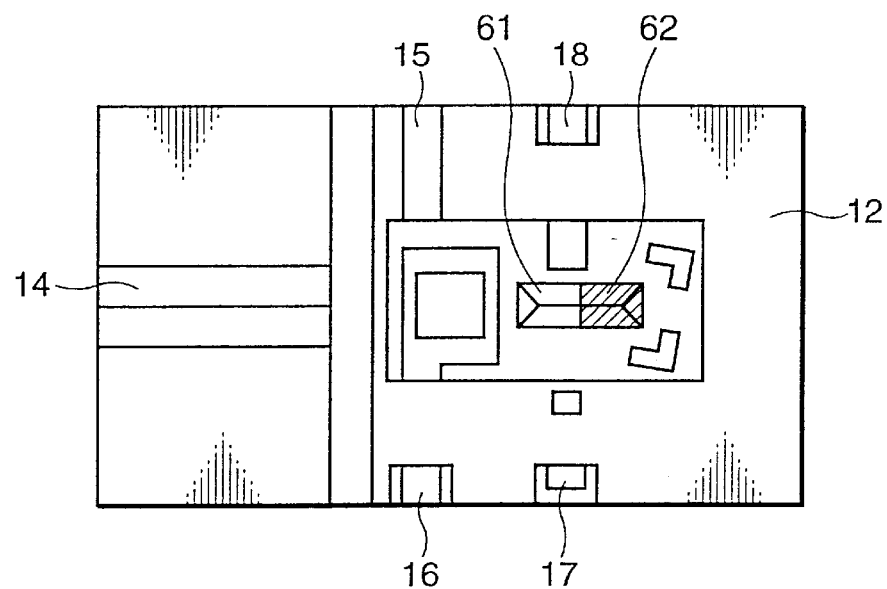
FIG. 15A is a plan view diagrammatically showing an optical component mounting substrate according to still yet another embodiment of the invention.
Figure 15B:
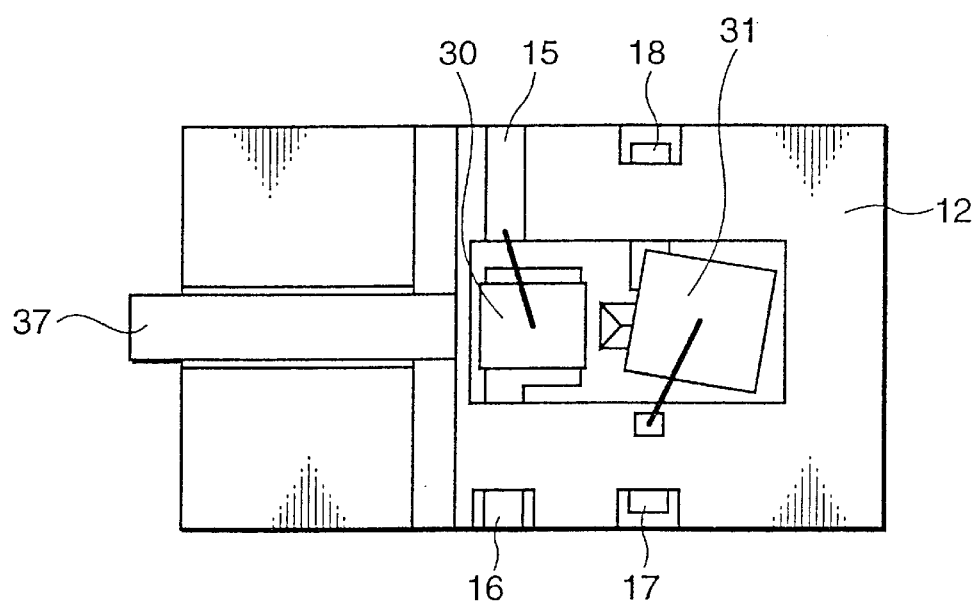
FIG. 15B is a plan view diagrammatically showing an optical module using the optical component mounting substrate shown in FIG. 15A.
Figure 16A:
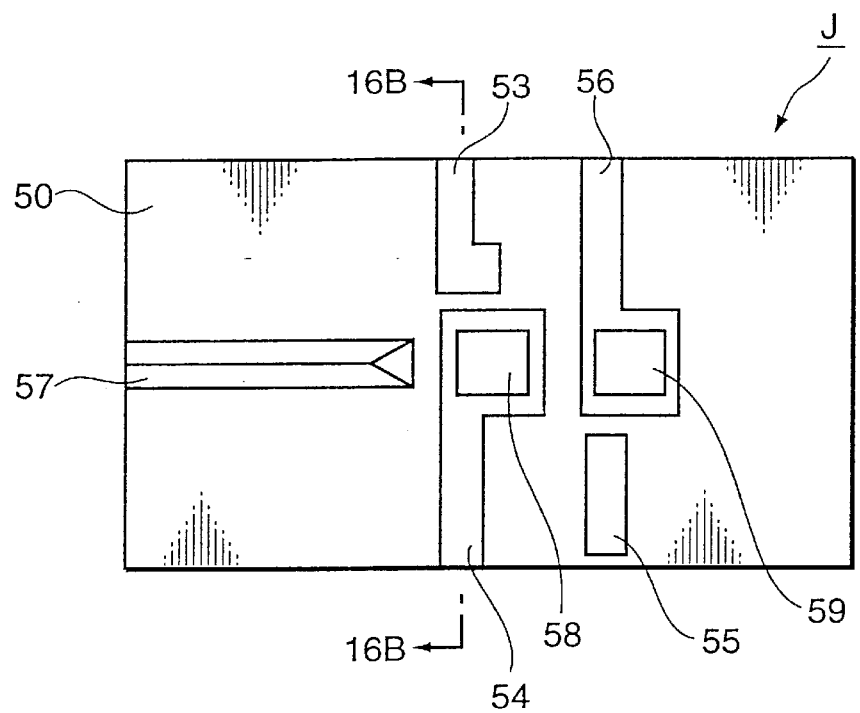
FIG. 16A is a plan view diagrammatically showing a conventional optical component mounting substrate.
Figure 16B:
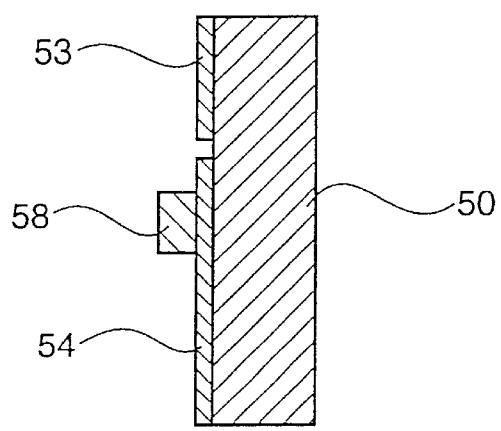
FIG. 16B is a section taken along the line 16B—16B of the optical component mounting substrate shown in FIG. 16A.

Although the light emitters of end reception type are employed as suitable ones to be mounted in a hybrid manner, it may be appropriate to form a V-shaped groove 61 in the substrate below a position where the light emitter 31 is placed, form reflecting surfaces by deposition of gold or like material on inner slanted surfaces 62, and detect a light emitted backward from the light emitter 30 and reflected by the reflecting surfaces by a light detector of surface reception type as shown in FIGS. 15A and 15B.

As described in detail above, an inventive testable substrate comprises a base member having a plurality of optical component mounting areas where light emitters and light detectors for detecting the lights emitted from the light emitters are to be mounted, first and second insulating layers formed on the base member, two kinds of conductive lines connectable with the two electrode terminals of the light emitter mounted in each optical component mounting areas, and two kinds of conductive lines connectable with the two electrode terminals of the light detector mounted in each optical component mounting areas. At least one of the two kinds of conductive lines connectable with light emitters and at least one of the two kinds of conductive lines connectable with light detectors are laid on different ones of the first and second insulating layers. In other words, at least one of the two kinds of conductive lines connectable with one of light emitters and light detectors are laid on the first insulating layer. At least one of the two kinds of conductive lines connectable with the other of light emitters and light detectors are laid on the second insulating layer.

With such a construction, the light emitters and the light detectors mounted in the respective optical component mounting areas can be quickly tested by driving them via the respective conductive lines and measuring the lights emitted from the light emitters by the corresponding light detectors. Further, since defects made during mounting of the optical components at wafer level can be easily and securely detected, highly reliable optical component mounting substrates can be obtained from the burn-in substrate.

In the inventive testable substrate, the two kinds of conductive lines connectable with light emitters and light detectors may be signal lines and ground lines, and the conductive lines laid on the different insulating layers may be signal lines. Since the signal lines of the light emitters and those of the light detectors are laid on the different insulating layers, the respective signal lines can be easily patterned, with the result that highly reliable testable substrates can be obtained.

Further, in the inventive testable substrate, light emitter and light detector may be mounted in each optical component mounting area. Defects made during mounting of the optical components at wafer level can be easily and securely detected.

Further, in the inventive testable substrate, the two kinds of conductive lines connectable with light emitters and two kinds of conductive lines connectable with light detectors may intersect with each other to form a lattice-shaped arrangement as a whole. With such an arrangement, probing can be very easily and quickly performed, and a probing construction in a burn-in apparatus can be simplified. Thus, an excellent burn-in substrate having a satisfactory operability of detecting defects can be realized.

Further, ground lines connectable with at least one of light emitters and light detectors may be laid on the same insulating layer as signal lines connectable with the one, and either side of each of the signal lines connectable with the one. With such a construction, a burn-in substrate having an excellent high-frequency characteristic can be realized.

Alternatively, the ground lines connectable with at least one of light emitters and light detectors may be laid on the insulating layer below an insulating layer on which the signal lines connectable with the one, facing the respective signal lines connectable with the one. With such a construction, a burn-in substrate having an excellent high-frequency characteristic can be realized.

Further, light emitters and light detectors may be mounted on the first insulating layer exposed through openings formed in the second insulating layer. With such a construction, the light emitters and the light detectors can be stably mounted on the base member.

An inventive testing method comprises the steps of preparing a substrate having a plurality of optical component mounting areas in which light emitters and light detectors for detecting lights emitted from the light emitters are to be mounted; mounting light emitters and light detectors in the respective optical component mounting areas of the testable substrate; heating the testable substrate having the light emitters and the light detectors mounted thereon to a predetermined temperature; and driving the light emitters and the light detectors mounted in the respective optical component mounting areas with the substrate heated at the predetermined temperature to measure the amount of light emitted from each light emitter by the corresponding light detector.

With such a method, the light emitters and the light detectors can be tested in their mounted states by mounting them in the respective optical component mounting areas, driving them via the respective conductive lines with the substrate heated at the predetermined temperature, and measuring the amounts of lights emitted from the respective light emitters by means of the corresponding light detectors.

In the inventive testing method, the testable substrate may comprise a base member having a plurality of optical component mounting areas in which light emitters and light detectors for detecting lights emitted from the light emitters are to be mounted; a first insulating layer formed on the base member; a second insulating layer formed on the first insulating layer; two kinds of conductive lines to be connected with opposite electrode terminals of the light emitters mounted in the respective optical component mounting areas; and two kinds of conductive lines to be connected with opposite electrode terminals of the light detectors mounted in the respective optical component mounting areas, wherein at least one of the two kinds of conductive lines to be connected with the light emitters and at least one of the two kinds of conductive lines to be connected with the light detectors are laid on different ones of the first and second insulating layers.

With such a method, a highly reliable test can be conducted since the two kinds of conductive lines to be connected with the light emitters and the two kinds of conductive lines to be connected with the light detectors are laid while being securely insulated from each other by the insulating layers.

Further, in the inventive method, the two kinds of conductive lines to be connected with the light emitters and the light detectors may be signal lines and ground lines, and the conductive lines laid on the different insulating layers may be signal lines. Then, since the signal lines of the light emitters and those of the light detectors are laid on the different insulating layers, the signal lines can be easily patterned to enable a highly reliable test.

Further, in the inventive method, the two kinds of conductive lines to be connected with the light emitters and the two kinds of conductive lines to be connected with the light detectors may intersect with each other to form a lattice-shaped arrangement as a whole. With such an arrangement, probing can be very easily and quickly performed, and an excellent testing method having a satisfactory operability in detecting defects can be realized.

Further, in the inventive method, the light emitters and the light detectors are mounted on the first insulating layer exposed by cutting away portions of the second insulating layer. Then, a highly reliable test can be conducted since the light emitters and the light detectors can be stably mounted on the base member.

Further, in the inventive method, each light detector may be of end-face coupling type which has a light sensing surface at a side facing the corresponding light emitter. Since such light detectors can securely detect the lights emitted from the corresponding light emitters, a highly reliable test can be conducted.

The present invention is not limited to the foregoing embodiments. Any suitable change can be made without departing the scope and spirit of the present invention provided that at least one of the two conductive lines to be connected with the opposite electrode terminals of the light emitter and at least one of the two conductive lines to be connected with the opposite electrode terminals of the light detector are provided on the different insulating layers.

This application is based on patent application No. 11-192049 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A testable substrate for mounting an optical component, comprising:

a base member having a plurality of optical component mounting areas in which light emitters and light detectors for detecting lights emitted from the light emitters are to be respectively mounted;

a first insulating layer formed on the base member;

a second insulating layer formed directly on the first insulating layer;

two kinds of conductive lines connectable with opposite electrode terminals of light emitters mounted in the respective optical component mounting areas; and two kinds of conductive lines connectable with opposite electrode terminals of light detectors mounted in the respective optical component mounting areas;

wherein at least one of the two kinds of conductive lines connectable with one light emitters and light detectors are laid on the first insulating layer, at least one of the two kinds of conductive lines connectable with the other of light emitters and light detectors are laid on the second insulating layer.

2. The testable substrate for mounting an optical component according to claim 1, wherein the two kinds of conductive lines connectable with light emitters and light detectors are signal lines and ground lines, and the conductive lines laid on the different insulating layers are signal lines.

3. The testable substrate for mounting an optical component according to claim 2, wherein the ground lines connectable with at least one of light emitters and light detectors are laid on the same insulating layer as the signal lines connectable with the one, and either side of each of the signal lines connectable with the one.

4. The testable substrate for mounting an optical component according to claim 2, wherein the ground lines connectable with at least one of light emitters and light detectors are laid on the insulating layer below an insulating layer on which the signal lines connectable with the one, facing the respective signal lines connectable with the one.

5. The testable substrate for mounting an optical component according to claim 2, wherein the two kinds of conductive lines connectable with light emitters and the two kinds of conductive lines connectable with light detectors intersect with each other to form a lattice-shaped arrangement as a whole.

6. The testable substrate for mounting an optical component according to claim 1, wherein a light emitter and a light detector are mounted in each optical component mounting area.

7. The testable substrate for mounting an optical component according to claim 1, wherein the second insulating layer is formed with through openings to expose the first insulating layer, and the through openings are adapted for mounting light emitters and light detectors on the first insulating layer.

* * * * *